United States Patent
Pinilla Pico et al.

(10) Patent No.: US 10,853,309 B2
(45) Date of Patent: Dec. 1, 2020

(54) FUSELOAD ARCHITECTURE FOR SYSTEM-ON-CHIP RECONFIGURATION AND REPURPOSING

(71) Applicant: Micron Technology, Inc., Boise, ID (US)

(72) Inventors: Lady Nataly Pinilla Pico, El Dorado Hills, CA (US); Praveen Gopalapuram, Folsom, CA (US); Akshay Arun Mote, Sunnyvale, CA (US)

(73) Assignee: Micron Technology, Inc., Boise, ID (US)

( * ) Notice: Subject to any disclaimer, the term of this patent is extended or adjusted under 35 U.S.C. 154(b) by 116 days.

(21) Appl. No.: 16/102,050

(22) Filed: Aug. 13, 2018

(65) Prior Publication Data
US 2020/0050581 A1 Feb. 13, 2020

(51) Int. Cl.
*G06F 15/80* (2006.01)
*G06F 9/30* (2018.01)

(52) U.S. Cl.
CPC ...... *G06F 15/8023* (2013.01); *G06F 9/30134* (2013.01)

(58) Field of Classification Search
CPC . G06F 15/8023; G06F 9/30134; G06F 9/4401
See application file for complete search history.

(56) References Cited

U.S. PATENT DOCUMENTS

| 6,888,751 | B2 * | 5/2005 | Makuta | G11C 29/789 365/185.09 |
|---|---|---|---|---|
| 7,551,488 | B2 * | 6/2009 | Tanikawa | G06F 11/1004 365/185.11 |
| 7,724,022 | B1 * | 5/2010 | Deskin | G11C 17/16 326/16 |
| 7,957,208 | B1 * | 6/2011 | Tang | G11C 29/028 326/39 |

(Continued)

FOREIGN PATENT DOCUMENTS

KR 20180029124 A 3/2018

OTHER PUBLICATIONS

ISA/KR, International Search Report and Written Opinion of the International Searching Authority, Int'l. Appl. No. PCT/US2019/044647, dated Nov. 15, 2019, Korean Intellectual Property Office, Seo-gu, Daejeon, Republic of Korea, 11 pgs.

*Primary Examiner* — Nha T Nguyen
(74) *Attorney, Agent, or Firm* — Holland & Hart LLP

(57) ABSTRACT

Methods, systems, and devices that support fuseload architectures for system-on-chip (SoC) reconfiguration and repurposing are described. Trim data may be loaded from fuses to registers on a die based on a fuse header. For example, a set of registers coupled with a set of fuses on the die may be identified, where the set of fuses may store trim data to be copied to the registers as part of a fuseload procedure. In such cases, one or more fuse headers may be identified within the trim data, and each fuse header may correspond to a fuse group that includes a subset of fuses. Based on one or more subfields within a fuse header, a mapping between (Continued)

fuse addresses and register addresses may be determined, and the trim data from each fuse group may be copied into a set of registers based on the mapping.

35 Claims, 8 Drawing Sheets

(56) References Cited

U.S. PATENT DOCUMENTS

| | | | | |
|---|---|---|---|---|
| 8,769,189 B2* | 7/2014 | Li | ............ | G06F 12/0246 |
| | | | | 711/103 |
| 8,842,482 B1* | 9/2014 | Kunst | ............ | G11C 7/04 |
| | | | | 365/185.04 |
| 2003/0236966 A1* | 12/2003 | Samra | ............ | G06F 9/3017 |
| | | | | 712/209 |
| 2006/0282720 A1* | 12/2006 | Hofsaess | ............ | G11C 29/56 |
| | | | | 714/718 |
| 2010/0318843 A1* | 12/2010 | Singh | ............ | G11C 29/4401 |
| | | | | 714/6.12 |
| 2013/0031319 A1* | 1/2013 | Gorman | ............ | H03M 7/30 |
| | | | | 711/157 |
| 2014/0189202 A1* | 7/2014 | Hosaka | ............ | G06F 12/0246 |
| | | | | 711/103 |
| 2014/0244991 A1 | 8/2014 | Akdemir et al. | | |
| 2014/0269123 A1* | 9/2014 | Kim | ............ | G11C 11/40618 |
| | | | | 365/200 |
| 2016/0224451 A1* | 8/2016 | Gorman | ............ | G11C 29/785 |
| 2017/0083316 A1 | 3/2017 | Burger et al. | | |
| 2018/0075920 A1* | 3/2018 | Fujiwara | ............ | G11C 17/16 |
| 2018/0189493 A1* | 7/2018 | Schilder | ............ | G01R 31/31858 |
| 2018/0241568 A1* | 8/2018 | Schilder | ............ | G06F 21/73 |
| 2019/0129862 A1* | 5/2019 | Yoshida | ............ | G06F 3/0662 |
| 2019/0278914 A1* | 9/2019 | Le Roy | ............ | H04L 9/3228 |
| 2019/0385661 A1* | 12/2019 | Koo | ............ | G11C 29/702 |

* cited by examiner

FUSELOAD ARCHITECTURE FOR SYSTEM-ON-CHIP RECONFIGURATION AND REPURPOSING

BACKGROUND

The following relates generally to system-on-chip (SoC) architectures and more specifically to a fuseload architecture for SoC reconfiguration and repurposing.

Some electrical devices (e.g., integrated circuits) may include various components of a computing hierarchy on a single chip. Such devices may be referred to as an SoC and may include, for example, a central processing unit (CPU) or processor, memory, controllers, input/output (I/O) interfaces, software, etc., integrated onto a single substrate or die. Although such devices may sometimes be complex due to the integration of various embedded components, software, and cores, an SoC may have a small form factor and may generally consume less power than other types of integrated circuits. Accordingly, SoCs may be utilized in a wide range of applications including medical devices (such as blood pressure monitoring devices), Internet of Things (IoT) devices (such as smart meters, smart locks, etc.), and personal electronics (such as mobile phones, tablets, smart-watches, etc.).

In some cases, the functionality of an SoC may be achieved by loading data that defines one or more settings of the SoC design, which may be stored on the chip and loaded upon a boot or reboot event. As an example, an SoC may utilize a set of "fuses" that store settings (e.g., "trims") related to the specification and/or requirements of an SoC design. The trims may be loaded to registers on the chip to provide a desired functionality, where the loading of trims from fuses (e.g., a "fuseload") may be performed using a pre-defined one-to-one mapping of fuse addresses to register addresses. Such pre-defined one-to-one mappings, however, may inhibit repurposing and reconfiguration of an SoC and limit the flexibility to load different fuses for different SoC configurations. Improved SoC designs are desired.

DETAILED DESCRIPTION

Figure 1:
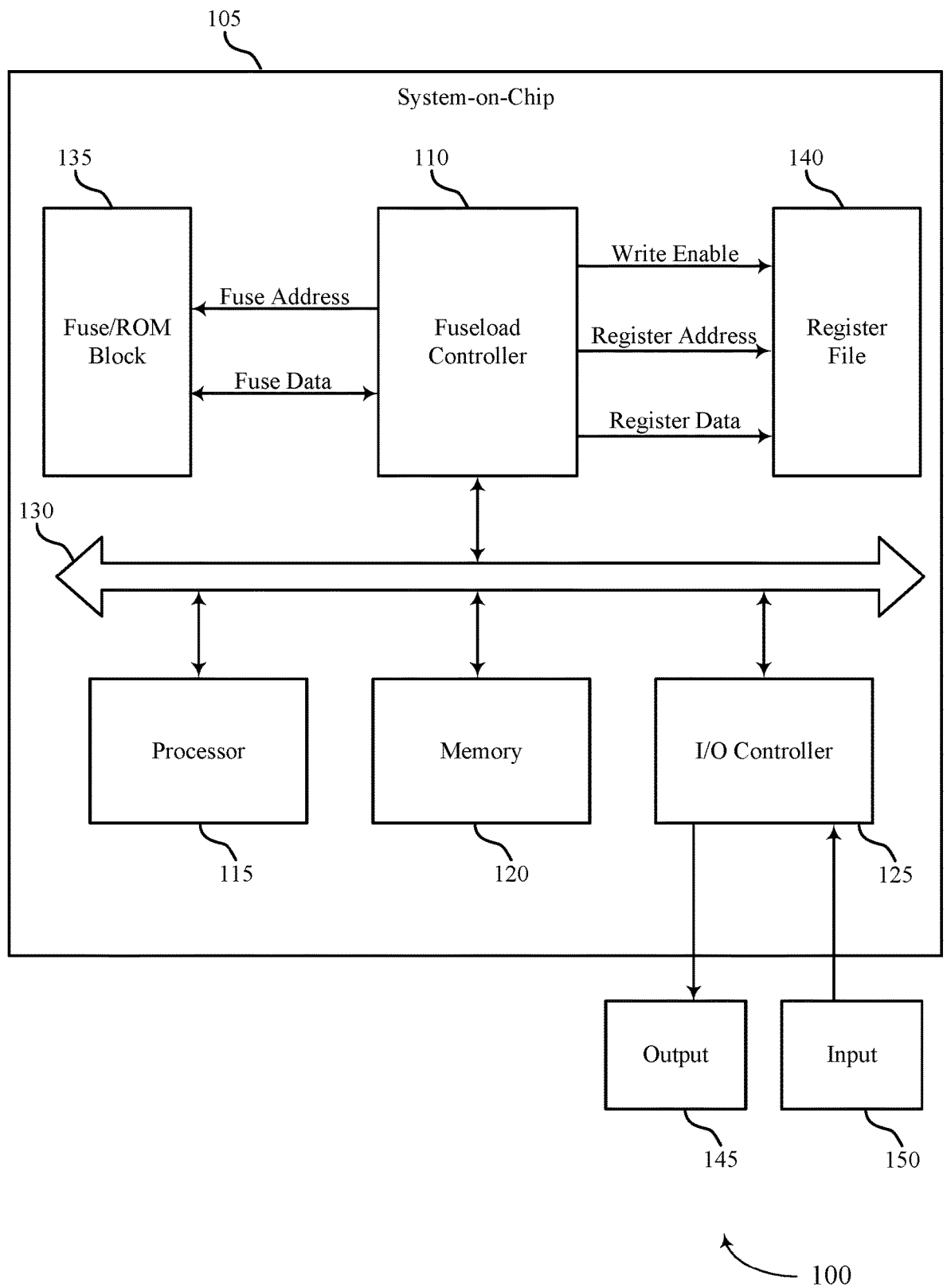
FIG. 1 illustrates an example of a system-on-chip (SoC) architecture that supports a fuseload architecture for SoC reconfiguration and repurposing in accordance with examples of the present disclosure.

A system-on-chip (SoC) may comprise an integrated circuit that combines multiple stand-alone components on a single die. For instance, an SoC may be designed with sets of components (including one or more processor cores, memory blocks, caches, interfaces, and so forth) with varying degrees of complexity that serve various embedded applications. As such, an SoC may include multiple integrated circuits for different operations, devices, and products. In some cases, particular settings (e.g., "trims") that are related to the specification and/or requirements for an SoC design may be loaded within the SoC, where such trims may be pre-written into a storage space (e.g., "fuses"). The trims may then be copied from fuses to internal registers of an SoC (such as control registers, mode registers, or the like) during a fuseload procedure to establish the settings of an SoC design. In some cases, there may be a one-to-one pre-defined mapping (e.g., a hardcoded hardware mapping) between fuse addresses and register addresses on the SoC die. For instance, each fuse address may be mapped to a pre-defined register address that is set in hardware during manufacturing.

In some cases, the ability to repurpose and reconfigure fuses may be desirable qualities for an SoC. For example, repurposing and reconfiguring fuses may enable an extension of SoC architecture life spans, and may also allow chip designers to create new or additional functionalities for a given die. However, the pre-defined one-to-one mapping between fuses and registers may require, for example, trim data from respective fuse addresses to always be mapped to a corresponding set of register addresses without variation, which may prohibit die repurposing and reconfiguration.

Further, fuses may be limited on a die (e.g., the number of fuses may impact die area and may accordingly be minimized in certain designs), and the ability to repurpose fuses may therefore maximize utilization of the die. But with a static one-to-one mapping between fuse addresses and register addresses, trims may be copied to registers irrespective of design requirement or configuration. For example, in one configuration of an SoC 105, trims may be needed, but for another configuration, only 80 trims may be needed. If the one-to-one pre-defined mapping is used, all trims may be copied in all situations regardless of the SoC configuration, which may result in a wastage of fuses or other resources, such as processing or energy resources (e.g., trim data from fuses may be unnecessarily copied, which may not be useful or efficient).

As described herein, techniques may be utilized to obviate the one-to-one pre-defined mapping between a fuse address space and a register address space. For example, the described techniques may enable a same SoC design to be configured with different settings (e.g., different trims) based on design specifications. Such techniques may be achieved through the use of a fuse header included with trim data copied from fuses. For example, a fuse header format may enable a modular and configurable mapping between fuse addresses and register addresses to provide added flexibility in loading trims to registers. The fuse header may include subfields providing, for example, one or more of a starting register address, a fuse header identity (ID), an indication that enables fuses to be skipped, and a count of fuses from which trims are copied. The subfields of the fuse headers may provide for the flexible copying of trims to a register file.

Accordingly, the described techniques may provide added flexibility in SoC designs when loading trims from fuses, which may include loading only trims that are desired for a particular design and therefore avoid writing an entire register file. Further, in an event of a chip breakdown, flaw or defect in manufacturing, changes in functional requirements, down-binning of die functionality, or the like, the described techniques may enable the configuration of registers to a different set of trims (e.g., without an engineering change order (ECO) to change mapping pointers). Further, the described techniques may enable the addition of fuse loadable registers (e.g., enable control registers which were non-fuse loadable to become fuse loadable) without an ECO, thereby saving time and avoiding additional costs when designing and producing an SoC.

Features of the disclosure are initially described in the context of an SoC architecture. Features of the disclosure are further described in the context of fuse headers and fuseload procedures. These and other features of the disclosure are illustrated by and described with reference to apparatus diagrams, system diagrams, and flowcharts that relate to fuseload architectures for SoC reconfiguration and repurposing.

FIG. 1 illustrates an example of an SoC architecture 100 that that supports a fuseload architecture for SoC reconfiguration and repurposing in accordance with examples of the present disclosure. The SoC architecture 100 illustrates an example of a SoC 105, which may include various components including a fuseload controller 110, a processor 115, memory 120, and an input/output (I/O) controller 125. Each of these component may be coupled through an on-chip interconnection 130. In some examples, the SoC architecture 100 and SoC 105 may include additional or different components than those described herein.

The SoC architecture 100 may enable functions of an electronic device, such as a computing device, a mobile computing device, a wireless device, a graphics processing device, or the like. For example, the SoC 105 may be utilized in various devices, such as a computer, a laptop computer, a tablet computer, a smartphone, a cellular phone, a wearable device, an internet-connected device, a gaming device, a medical device, a camera, a navigation device, an Internet-of-Things (IoT) device, a video player, and so forth. In some cases, the SoC 105 may be a component of a system configured to perform various functions as specified for a particular application or design.

In some examples, SoC 105 may have functionality associated with one or more settings, referred to as "trims," that may be related to the specification, requirements, configuration, and/or performance of the SoC 105. The trims may be pre-written into "fuses" that comprise a storage space that stores the trim data for the SoC 105 to load. Thus, at power up, the SoC 105 may be loaded with the trims that determine particular settings of the SoC 105, where loading trims from fuses into internal registers of the SoC 105 may be referred to as "fuseload" or a fuseload procedure. The SoC 105 may include a fuseload controller 110 that is used to perform such fuseload procedures.

The fuseload controller 110 may be a device that carries out the fuseload procedure by copying trims from fuses into registers. For example, the fuseload controller 110 may be coupled with a fuse block 135 and a register file 140. The fuse block 135 may include a set of fuses on the SoC 105, where data may be stored and held on each of the fuses within fuse block 135. In some cases, the fuse block 135 may be or include a memory device, such as read-only memory (ROM), where trims may be stored for access by the fuseload controller 110. Additionally, the register file 140 may include a set of registers on the SoC 105. The registers within register file 140 may include one or more processor registers, which may be an example of data registers, mode registers, control registers, floating-point registers, special-purpose registers, or the like. The registers may be used for loading data for computations, manipulation, or other operations. Further, the set of fuses at fuse block 135 may be coupled with the set of registers at the register file 140, for example, via the fuseload controller 110.

The fuseload controller 110 may perform features of a fuseload procedure on the SoC 105. For instance, the fuseload controller 110 may identify an address of a fuse within fuse block 135 and may query the identified fuse address to obtain fuse data stored at the fuse address. During a fuseload procedures, a fuse address may be read by the fuseload controller 110, and a set of trim data (e.g., content from a fuse address of fuse block 135) comprising a number of bits may be received at the fuseload controller 110. In some examples, the trim data may be 40 bits, and the 40 bits may be written to 8 registers of the register file 140, with 5 bits written to each register. However, it is noted that the trim data may include any number of bits to be written to any number of registers (e.g., based on a configuration of the SoC 105). In any case, the fuse data (e.g., trims or trim data) from a fuse address may be written to a register address by the fuseload controller 110, where the fuseload controller 110 may first write enable the register file 140. The fuseload controller may then identify a register address for which data is to be written to, and copy trims to the identified register address of the register file 140.

The processor 115 may be configured to control at least portions of the SoC 105. For example, the processor 115 may include an intelligent hardware device, (e.g., a general-purpose processor, a digital signal processor (DSP), an application-specific integrated circuit (ASIC), a microcontroller, a field-programmable gate array (FPGA) or other programmable logic device, discrete gate or transistor logic, discrete hardware components, or it may be a combination of these types of components). In such cases, the processor 115 may be an example of a central processing unit (CPU), a graphics processing unit (GPU), an array/vector CPU, among other examples. In some cases, the processor 115 may be configured to operate a memory array using a memory controller.

In other cases, a memory controller may be integrated into the processor 115. In some examples, the processor 115 may be configured to execute computer-readable instructions stored in a memory (e.g., the memory 120) to cause the SoC 105 to perform various functions (e.g., functions or tasks supporting fuseload procedures performed on a die). In some cases, the SoC 105 may include multiple processors 115. In some examples, the processor 115 may perform functions or operations ascribed herein to the fuseload controller 110. Additionally or alternatively, the fuseload controller 110 may be partially or entirely included within the processor 115.

The memory 120 may include random-access memory (RAM) and read-only memory (ROM). The memory 120 may store computer-readable, computer-executable code including instructions that, when executed, cause a processor to perform various functions described herein. In some cases, the memory 120 may contain, among other things, a basic input/output system (BIOS) which may control basic hardware or software operation on SoC 105, such as the interaction with peripheral components or devices.

The I/O controller 125 may manage input and output signals for the SoC 105. For instance, the I/O controller may include an output driver, which may be controlled by one or more register bits of the SoC 105. The I/O controller 125 may manage peripheral components not integrated into the SoC 105. In some cases, the I/O controller 125 may represent a physical connection or port to an external peripheral or other device. For example, the I/O controller 125 may represent or interact with a modem, a keyboard, a mouse, a touchscreen, or a similar device. In some cases, the I/O controller 125 may be implemented as part of a processor. A user may interact with the SoC 105 via the I/O controller 125 or via hardware components controlled by the I/O controller 125. In some cases, the I/O controller 125 may manage data communication between the processor 115 and peripheral component(s), input 145, output 150, or other components.

The input 145 may represent a device or signal external to the SoC 105 that provides information, signals, or data to the SoC 105 or its components. This may include a user interface or interface with or between other devices. In some cases, the input 145 may be a peripheral that interfaces with the SoC 105 via one or more peripheral components or may be managed by the I/O controller 125.

The output 150 may represent a device or signal external to the SoC 105 configured to receive an output from the SoC 105 or any of its components. Examples of the output 150 may include a display, audio speakers, a printing device, or another processor on a PCB, etc. In some cases, the output 150 may be a peripheral that interfaces with the SoC 105 via one or more peripheral components or may be managed by the I/O controller 125.

The components of SoC 105 may be in electronic communication with one another using the on-chip interconnection 130. In some cases, the on-chip interconnection may utilize various interconnect schemes, such as bus topologies, point-to-point topologies, ring topologies, crossbar topologies, tree topologies, etc. The components of SoC architecture 100 may be made up of general-purpose or special purpose circuitry designed to carry out their functions. This may include various circuit elements, for example, conductive lines, transistors, capacitors, inductors, resistors, amplifiers, or other active or passive elements, configured to carry out the functions described herein.

Some SoC designs may utilize a one-to-one mapping that is pre-defined between a fuse address space and a register address space. As an illustrative example, an SoC die may have a total of 1500 registers (e.g., control registers, mode registers, etc.), where each register may hold a certain number of bits (e.g., 5 bits per register for a total of 7500 bits). Of these registers, 96 registers (e.g., corresponding to 480 bits) may be identified as registers to be loaded during an initialization fuseload. The 96 registers may be partitioned into different register groups (e.g., three groups of 32 registers, or some other grouping). In some examples, the registers in each group may have sequential register addresses, but the grouping of registers may or may not correspond to sequential register addresses.

For instance, a first register group may include registers with addresses 0 through 31, a second register group may include registers with addresses 40 through 71, and a third register group may include registers with addresses 940 through 971. It is noted that different numbers of registers may be included in different register groups. A pre-defined one-to-one mapping may correspond to a first fuse address (e.g., 'd0) that is mapped to a first set of register addresses (e.g., 'd0, 'd1, 'd2, 'd3, 'd4, 'd5, 'd6, and 'd7). Similarly, another fuse address (e.g., 'd5) may be mapped to a second set of register addresses (e.g., 'd48, 'd49, 'd50, 'd51, 'd52, 'd53, 'd54, and 'd55), and so forth. Such a pre-defined mapping may be fixed in the hardware (e.g., at the time of manufacture).

However, with the use of the pre-defined one-to-one mapping, fuse addresses may not be mapped to any other register addresses. For instance, in the above example, with fuse address 'd5 mapped to the second set of register addresses 'd48, 'd49, 'd50, 'd51, 'd52, 'd53, 'd54, and 'd55, fuse address 'd5 may not be mapped to a different register address space (e.g., without an ECO, which may be costly and take time). In other words, the one-to-one mapping may not allow for fuse reassignment.

In addition, the pre-defined mapping may require that all trims be written into fuses (e.g., an entire fuseload), which may be performed by default. Thus, such configurations may not provide flexibility (e.g., during manufacturing and/or post manufacturing of a die) to load only fuses needed for a given die configuration. As a result, all trims may always be loaded, as opposed to a subset of trims needed for a particular die configuration (e.g., related to a design specification). Further, the pre-defined mapping may not allow for reconfigurability to fuseload operations. That is, the pre-defined mapping may not allow for fuses to be loaded in a reconfigurable order, or for skipping certain fuses, and may thereby limit or prohibit flexibility in reconfiguring the fuses to be loaded.

As described herein, the SoC architecture 100 may support techniques that provide reconfigurability for loading trims, avoiding one-to-one pre-defined mappings between fuse addresses and register addresses, which may add flexibility for skipping or otherwise allowing copying of subsets of trims. Such techniques may be achieved through the use of a fuse header.

For example, a fuse header format may be used by the fuseload controller 110 to enable a modular and configurable mapping between fuse addresses of fuse block 135 and register address of register file 140 with added flexibility in loading trims. The fuse header may be a certain number of bits (e.g., 40 bits) within trim data stored at the fuse block 135, and may include subfields that carry information instructing the fuseload controller 110 how to perform fuseload. Examples of the subfields may include one or more of a register start address, a fuse header ID, a skip option, or a fuse count. The subfields of such fuse headers may provide for the flexible copying of trims to a register file 140.

Thus, the described techniques may be used to efficiently repurpose a number of fuses on a die, which may allow for a product to be taped-out without or with minimal ECOs, as fuses (and the mapping of fuse addresses to register addresses) may be flexibly re-configured. Such techniques may further enable the utilization of unused fuse space on a die. For instance, use of the fuse header may accommodate additional registers on a die, where the additional registers may become fuse-loadable through the reconfigurability provided by the fuse header.

As an example, a die having a static one-to-one mapping may be functional, but may no longer be used for a particular configuration or product. However, the still-functional die may have a mapping between fuse addresses and register addresses restructured through the use of the fuse header, thereby preventing the die from being discarded or otherwise going unused. Further, the described techniques may enable additional control and flexibility for fuseload procedures by the fuseload controller 110 and fuse utilization (e.g., by a producer or a consumer of the SoC). For example, the reconfigurability and repurposing schemes may provide advantages to post-silicon design teams, and may be extended to platform design teams and users.

Figure 2:
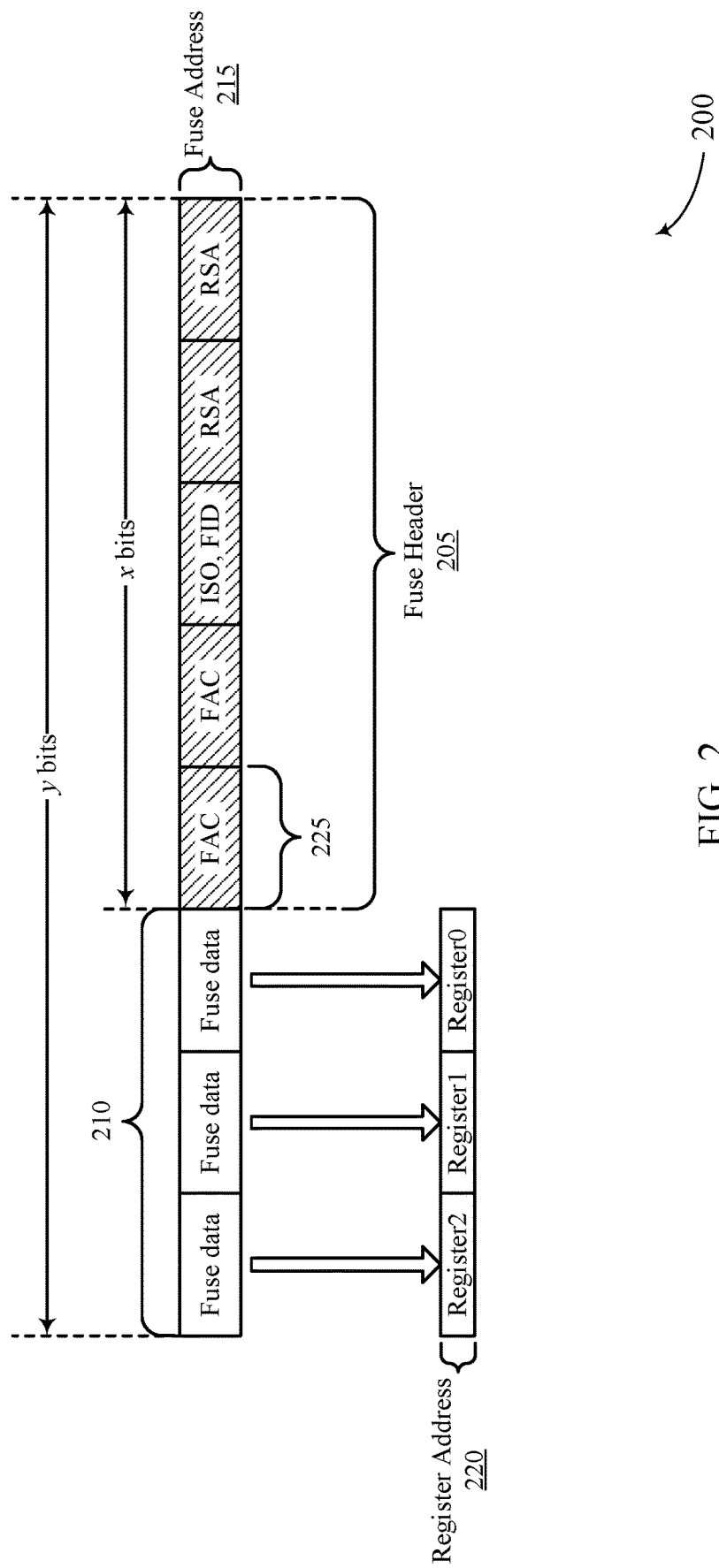
FIG. 2 illustrates an example of a fuse header configuration that supports a fuseload architecture for SoC reconfiguration and repurposing in accordance with examples of the present disclosure.

FIG. 2 illustrates an example of a fuse header configuration 200 that supports a fuseload architecture for SoC reconfiguration and repurposing in accordance with examples of the present disclosure. In some examples, the fuse header configuration 200 may be utilized by a fuseload controller, such as the fuseload controller 110 described with reference to FIG. 1, during a fuseload operation or procedure. In some cases, the fuse header configuration 200 may enable trim data to be coherently copied from a set of fuses to a set of registers using a configurable mapping between fuse addresses and register addresses.

In some cases, a fuseload controller may use a fuse header protocol that defines the fuse header configuration 200, where the fuse header configuration 200 may include a fuse header 205 that facilitates the copying of fuse data 210 from one or more fuse addresses 215 to one or more register addresses 220. For example, the fuse header 205 may be included with the fuse data 210 (e.g., trim data associated with the settings of a SoC and stored at the fuse address 215) that is read by a fuseload controller, and may provide information to the fuseload controller regarding how trim data may be copied during fuseload.

The fuse header 205 may be formatted to include a certain number of bits (e.g., 25 bits) out of a total number of bits stored at a fuse address 215 (e.g., 40 bits). The fuse header 205 may be the first portion of data that is read from a fuse address 215. For instance, a fuse header 205 may comprise the first 25 bits that the fuseload controller reads before any other fuse data 210 stored at the fuse address 215. The fuse header 205 may also include one or more subfields 225 that provide information to the fuseload controller related to how fuse addresses 215 may be mapped to register addresses 220. For example, the one or more subfields 225 may include a fuse address count (FAC) subfield 225, an initial skip option (ISO) subfield 225, a fuse header ID (FID) subfield 225, a register start address (RSA) subfield 225, or any combination thereof.

Each of the subfields 225 may comprise any number of bits of the fuse header 205. In some cases, a subfield 225 may include any combination of information, where, for example, data including two or more subfields 225 may be combined within a same subfield. For instance, as illustrated, the ISO subfield 225 and the FID subfield 225 may be included in a same subfield 225. In some cases, the subfields 225 may be included in the fuse header 205 in a different order or arrangement than shown in FIG. 2, and additional or different subfields 225 providing information for fuseload procedures also may be included in the fuse header 205.

In some cases, the RSA subfield 225 of the fuse header 205 may include an indication of a beginning register address 220 for fuseload. For example, the value or indication provided by the RSA subfield 225 may point a fuseload controller to a starting register address 220 to which trims are to be copied to during fuseload.

The FID subfield 225 may include an identity of a current fuse header 205 (e.g., from a set of one or more fuse headers 205) that the fuseload controller reads from a set of fuse address 215. The FID subfield 225 may provide a further indication of whether fuse data 210 associated with a current fuse header 205 is to be copied. For instance, an FID subfield 225 with a logic value of 0 may indicate that the current fuse header 205, and the fuse data 210 associated with that fuse header 205, may not be copied. In other cases, an FID subfield 225 having a value of 1 may indicate to the fuseload controller that the associated fuse data 210 is to be copied.

The ISO subfield 225 may provide an indication that trims associated with a current fuse header 205 may be skipped during a fuseload procedure. For instance, upon reading the ISO subfield 225 from a first fuse header 205, the fuseload controller may refrain from copying trims from the fuse address 215 (or fuse addresses 215) that correspond to the first fuse header 205. The fuseload controller may then proceed to read a subsequent fuse header 205 (e.g., with the option to subsequently copy trims associated with the first fuse header 205 based on a configurable fuseload order).

The FAC subfield 225 may indicate the number of fuses or fuse addresses 215 that are included in a particular fuse group or fuse header group (e.g., a set of fuses associated with a fuse header 205). In such cases, the fuseload controller may increment a counter when copying trim data from fuse addresses 215, and may terminate a fuseload procedure for a current fuse header 205 based on the FAC subfield 225.

Figure 3:
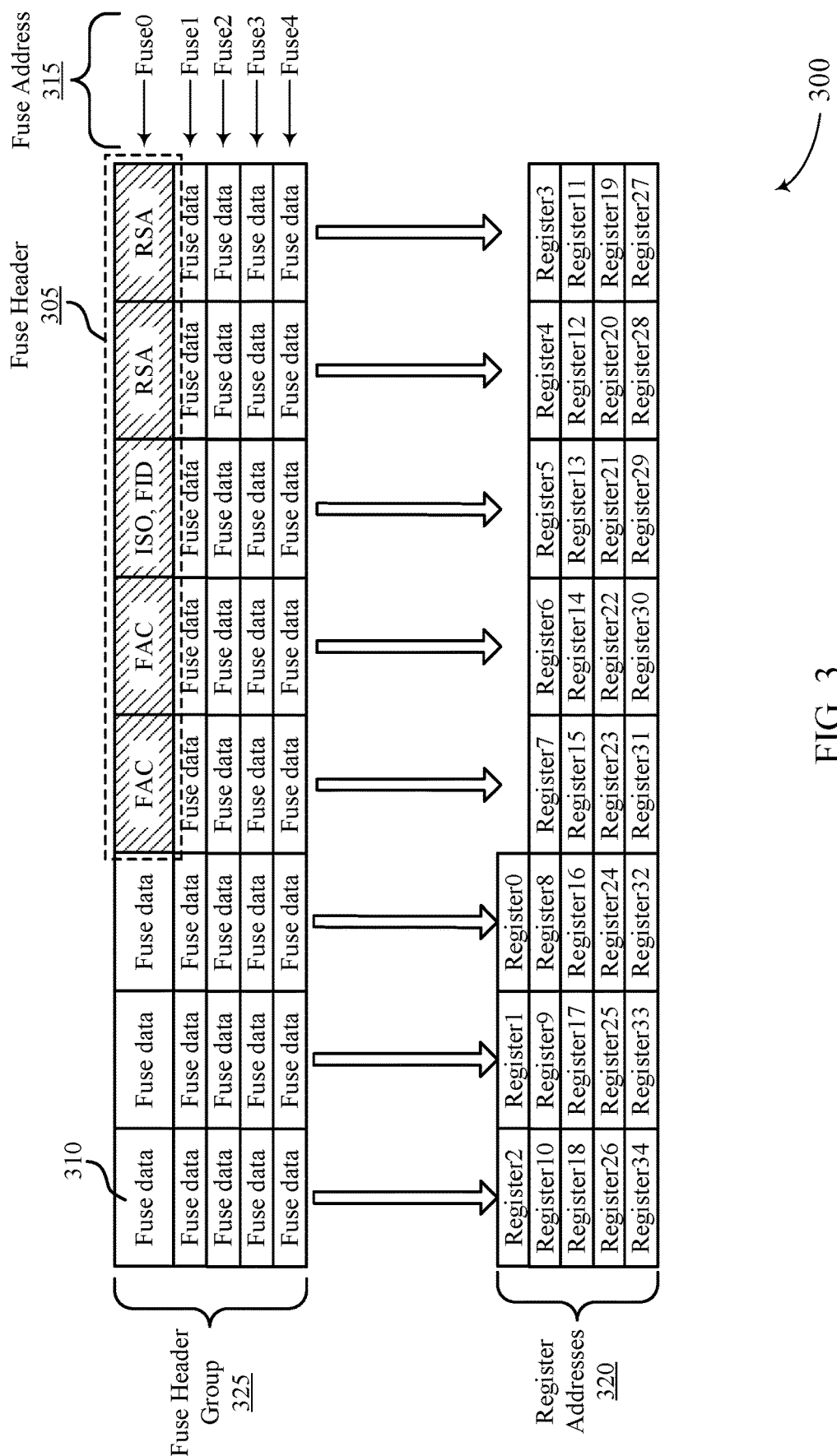
FIG. 3 illustrates an example of a fuse group configuration that supports a fuseload architecture for SoC reconfiguration and repurposing in accordance with examples of the present disclosure.

FIG. 3 illustrates an example of a fuse group configuration 300 that supports a fuseload architecture for SoC reconfiguration and repurposing in accordance with examples of the present disclosure. In some examples, the fuse group configuration 300 may be utilized by a fuseload controller, such as the fuseload controller 110 described with reference to FIG. 1, during a fuseload operation or procedure. In some cases, the fuse group configuration 300 may enable trim data to be coherently copied from a set of fuses to a set of registers using a configurable mapping between fuse addresses and register addresses.

In some cases, a fuseload controller may use a fuse header protocol that defines the fuse group configuration 300. For example, the fuse group configuration 300 may include a fuse header 305 that enables copying of fuse data 310 from one or more fuse addresses 315 to one or more register addresses 320. Further, multiple groups of fuse addresses 315 may be defined, and may comprise a fuse header group 325 (or fuse group). For example, each fuse header 305 be associated with, and provide information for copying fuse data 310 from, one or more fuse addresses 315 within the fuse header group 325. As such, the fuse header 305 may be unique to each fuse header group 325 and may address different regions of a register address space.

In some cases, and as described below, multiple fuse header groups 325 may be separated by respective fuse headers 305. For instance, each fuse header 305 for a set of fuses may be associated with a subset of fuse addresses 315, where the subset of fuse addresses 315 correspond to a fuse header group 325. In some cases, a single fuse header 305 may be associated with all fuses on a die. In other examples, any number of fuse headers 305 may be used for different subsets of fuses on the die. As an example, a first fuse header group 325 may include a set of five fuse addresses (e.g., Fuse0 through Fuse4).

The fuse header 305 may comprise a first number of bits (e.g., 25 bits) at the first fuse address 315 (e.g., Fuse0) and may signal the beginning of the first fuse header group 325. Accordingly, out of the total number of bits at Fuse0 (40 bits in this example), the first 25 bits may comprise the subfields of the fuse header 305, including an RSA subfield (e.g., comprising 10 bits), an FID subfield (e.g., comprising 4 bits), an ISO subfield (e.g., comprising one bit), and an FAC subfield (e.g., comprising 10 bits). As mentioned above, each subfield and thus the fuse header 305 may comprise any number of bits, and the examples described herein are provided only for descriptive clarity.

A fuseload controller may use the fuse header 305 for copying trim data of the fuse header group 325 to a set of registers. In keeping with the above numeric examples, each fuse address 315 may include 40 bits of trim data, and a fuse header may comprise 25 bits of the 40 bits of trim data. Each set of trim data from respective fuse addresses 315 may be copied to eight 5-bit registers. The mapping information may be extracted from the subfields of the fuse header 305 by the fuseload controller based on the fuse header 305 (as opposed to, e.g., based on a hard-coded one-to-one mapping between fuse addresses 315 and register addresses 320). As such, the fuseload controller may begin from a first fuse address 315 (e.g., fuse0) that includes the fuse header 305.

The fuseload controller may identify, from the fuse header 305, an RSA subfield. Based on the RSA subfield, the fuseload controller may determine a portion of the mapping between fuse addresses 315 and register addresses 320. For instance, the RSA subfield in the fuse header 305 may indicate a starting register address 320 where trim data is to be copied. That is, when the fuseload controller performs the fuseload, trims may be sequentially copied beginning with the starting register address 320 as indicated by the RSA subfield in the fuse header 305 (e.g., Register0, in this case). The fuseload controller may identify, from the fuse header 305, an FID subfield.

The fuse header 305 at the first fuse address 315 may include a non-zero FID subfield, which may indicate to the fuseload controller that trim data for a current fuse header group 325 is to be copied (as opposed to, e.g., a fuse header ID subfield with a zero value, which may indicate that trim data for the current fuse header group 325 is not to be copied). The fuseload controller may identify, from the fuse header 305, an ISO subfield. The ISO subfield within the fuse header 305 may provide an indication to the fuseload controller of whether the current fuse header group 325 is to be skipped (e.g., associated trim data is not to be copied). Further, the fuseload controller may identify, from the fuse header 305, a FAC subfield. The FAC subfield of the fuse header 305 may indicate to the fuseload controller the total number of fuse addresses 315 in the fuse header group 325 as well as where the current fuse header group 325 ends (e.g., a last fuse address 315 to be copied (e.g., Fuse4) within the fuse header group 325).

The fuseload controller may initiate a sequential process for the fuseload based on the fuse header 305, where the first 5 bits following the fuse header 305 may be copied into a first register address (e.g., Register0, which may correspond to the register start address indicated by the RSA subfield), a subsequent 5 bits may be copied into a subsequent register address (e.g., Register1), and so on. Once the entire fuse address 315 (e.g., Fuse0) is read, the fuse address 315 may be incremented by the fuseload controller, and the process of copying fuse data 310 from a second fuse address 315 (e.g., Fuse1) may be repeated with trim data being copied to respective register addresses 320.

In such cases, the 40 bit fuse data 310 of the second fuse address 315 (e.g., Fuse1) may be sequentially read, and the trims may be copied in increasing order of eight 5 bit register addresses 320 (e.g., to Register3, Register4, Register5, Register6, Register7, Register8, Register9, and Register10). The fuse address 315 may then be incremented again (e.g., to Fuse2) and a similar process may be performed for each subsequent fuse address 315 within the same fuse header group 325 (e.g., associated with the first fuse header 305 and as indicated by the FAC subfield).

The described process may be repeated until the fuse address count indicated by the FAC subfield of the fuse header 305 is reached. Once the fuse address count is reached, the fuseload controller may proceed to read a second fuse header 305 associated with a second, different, fuse header group 325. In some cases, the second fuse header 305 may include a non-zero FID subfield. Accordingly, the fuseload controller may perform the above process of copying trim data to register addresses based on the information provided in the fuse header 305 of the second fuse header group 325. The fuseload controller may continue to read fuse header groups 325 until it reaches a fuse address where the fuse header 305 is empty (e.g., all zeros). In such cases, the fuseload procedure may then be completed (e.g., terminated by the fuseload controller).

Figure 4:
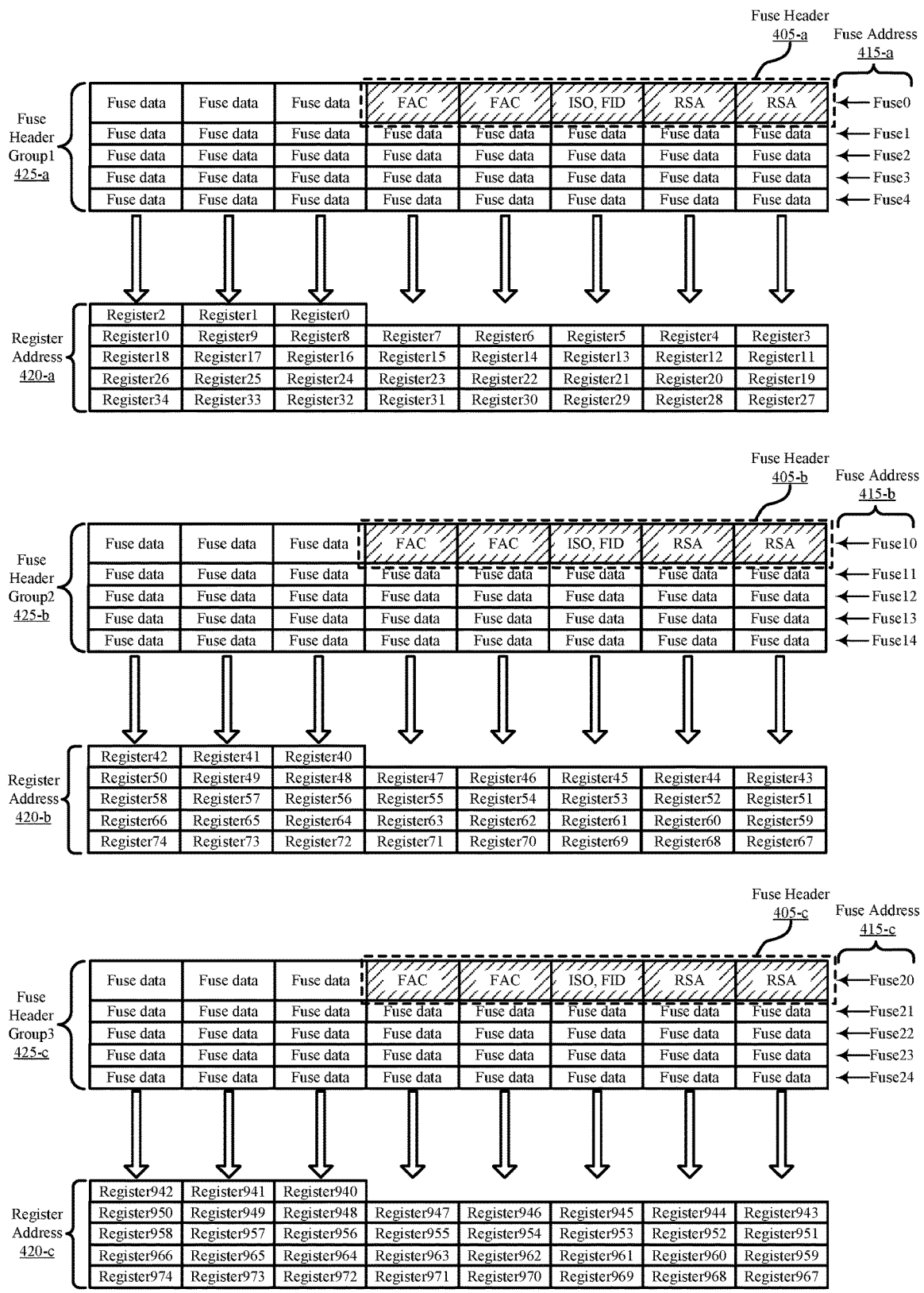
FIG. 4 illustrates an example of fuse groups that support a fuseload architecture for SoC reconfiguration and repurposing in accordance with examples of the present disclosure.

FIG. 4 illustrates an example of fuse groups that support a fuseload architecture for SoC reconfiguration and repurposing in accordance with examples of the present disclosure. In some examples, the fuse groups 400 may be utilized by a fuseload controller, such as the fuseload controller 110 described with reference to FIG. 1, during a fuseload procedure. In some cases, the fuse groups 400 may enable trim data to be coherently copied from a set of fuses to a set of registers using a configurable mapping between fuse addresses and register addresses. For instance, the information included within fuse headers of the fuse groups 400 may enable or disable skipping of different fuse header groups during a fuseload procedure.

As described above with reference to FIG. 3, a fuse header 405 may be used by a fuseload controller during fuseload, where the fuse header 405 may provide information used for copying of fuse data from one or more fuse addresses 415 to one or more register addresses 420. Additionally, multiple fuse headers 405 may be used, and each fuse header 405 may be associated with a fuse header group 425.

For instance, a first fuse header 405-a may correspond to a first fuse header group 425-a that includes one or more fuse addresses 415-a (e.g., Fuse0 through Fuse4) with data available to be copied to a first set of register addresses 420-a, a second fuse header 405-b may correspond to a second fuse header group 425-b that includes one or more fuse addresses 415-b (e.g., Fuse10 through Fuse14) with data available to be copied to a second set of register addresses 420-b, and so forth. As such, the fuseload controller may perform a fuseload of each fuse header group 425 in accordance with the information contained within the subfields of the respective fuse headers 405, such as described above with reference to FIGS. 2 and 3.

As the mapping of fuse addresses 415 to register addresses 420 may be provided through the fuse header 405, the fuse addresses 415 in different fuse header groups 425 may be mapped to any given register space. For instance, in the example of the second fuse header group 425-b, fuse addresses 415-b (e.g., Fuse10 through Fuse14) may be mapped to the second set of register addresses 420-b (e.g., Register40 through Register74). Additionally or alternatively, the mapping may be modified by changing one or more fuse headers 405. For example, an RSA subfield in the second fuse header 405-b may be changed to enable updates or modifications to the mapping of fuse addresses 415 to register addresses. For example, the RSA subfield in the second fuse header 405-b may be changed from indicating "Register40" to now indicate "Register80." Thus, the mapping may be dynamically modified, resulting in fuse addresses 415 being copied to registers starting from a designated register address (e.g., Register80, in this example). Such techniques may beneficially enable on-thefly reconfiguration and repurposing of fuses for loading trims to a different set of registers.

Further, different fuseload configurations may be specified. For instance, a first configuration may be defined that corresponds to a fuse header 405 having an RSA subfield indicating "Register40" as a beginning register address in addition to a fuse count subfield indicating 5 fuse address 415 (e.g., Fuse10 through Fuse14) to be copied. Therefore, the first configuration may copy the trim data from the second fuse header group 425-b into register addresses 420-b from Register40 to Register74 (e.g., 175 bits of fuse data copied to 35 respective 5-bit registers).

Additionally, in a second configuration, register addresses Register40 through Register66 may be fuse loaded. Thus, the RSA subfield of a fuse header 405 may indicate register address "Register40," and the fuse count subfield may be indicate that fuse data from 4 fuses (e.g., Fuse10 through Fuse13) is to be copied. As a result, the second configuration may copy the contents of the fuses of the second fuse header group 425-b into registers addressed from Register40 to Register66, avoiding unnecessarily loading fuse data from a fuse (e.g., Fuse14, in this case), and the use of modified parameters within the subfields of fuse header 405 may enable controllability of fuse allocation.

Fuse headers 405 may also allow certain fuse header groups 425 to be skipped during a fuseload procedure. The ISO subfield of the fuse header 405 may provide features that allow fuseload schemes to skip and/or allow (e.g., not skip) the copying of trims associated with the fuse header 405. By using these features, the die may be flexibly configured through the coherent selection of certain trim data needed for the die, where some trims may be copied and others may not. As an illustrative example, when the fuses of a fuse header group 425 are to be written, the ISO subfield (e.g., comprising 1 bit) may be set to a logic value of 0. The fuseload controller may identify a non-zero FID and FAC subfields, and may begin copying fuses. However, if the fuseload controller identifies a skip option bit set to 1, even though the fuse header 405 is present and includes data within one or more subfields, the fuseload controller may skip copying the trims for the particular fuse header group 425 associated with the fuse header 405 based on the skip bit set to 1.

By way of example, the first fuse header 405-a may include an indication to skip the first fuse header group 425-a based on the ISO subfield. The fuseload controller may then skip the first fuse header group 425-a, and proceed with reading the second fuse header 405-b of the second fuse header group 425-b. The fuseload controller may then determine whether the second fuse header 405-b includes information indicating that the second fuse header group 425-b is to be loaded to the second set of register addresses 420-b. Such features may allow for additional flexibility in fuseload procedures.

The use of fuse headers 405 may also enable reconfigurability and repurposing of a die, where reconfigurability may be achieved by a flexible choice of fuseload. For example, using a first fuseload configuration, an SoC may be configured to load all fuse header groups 425 (e.g., fuse header groups 425-a, 425-b, and 425-c), in a second fuseload configuration an SoC may only load two fuse header groups 425 (e.g., fuse header groups 425-a and 425-c), while in a third fuseload configuration, a die may load fuse header groups 425 in a different order (e.g., a third fuse header group 425-c before the first fuse header group 425-a). Such variability in fuseload configurations may be achieved by setting the initial skip option bit and writing the fuses in the desired order. In some cases, through the use of different configurations, one or more registers may be defined which can be trim-backed (e.g., fuse loadable) that might be identified during a late post-silicon process (and not initially planned for in a design). Such techniques may provide the ability to address feature modification and configurability per die.

Fuse headers 405 utilized during fuseload procedures, including the skip/allow functionality described above, may further enable die manufacturers, engineers, and users to re-purpose and re-allocate trims and provide an efficient utilization (and re-utilization) of fuses on a die. Further, the described techniques may provide for flexibility and time savings when loading trims, and may allow the configuration of trim loads per design requirement while avoiding redundant copying of trims when not needed. As a result, the use of the fuse header 405 may enable financial and resource savings in project stepping, and may further avoid design changes (ECOs) for adding/re-structuring of fuses on a die as the described fuse header protocol facilitates such features.

Figure 5:
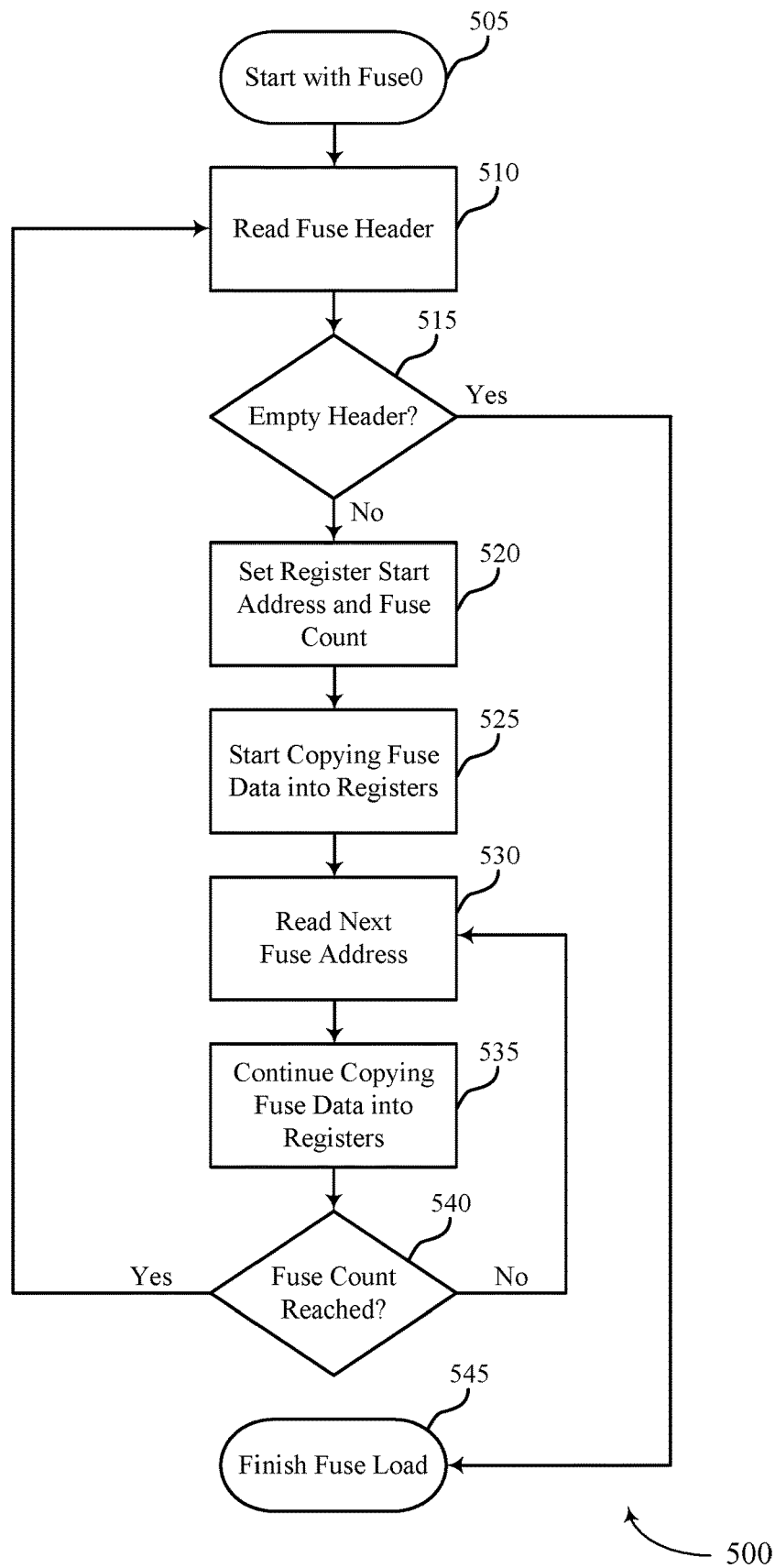
FIG. 5 illustrates an example of a flowchart that supports a fuseload architecture for SoC reconfiguration and repurposing in accordance with examples of the present disclosure.

FIG. 5 illustrates an example of a flowchart 500 that supports a fuseload architecture for SoC reconfiguration and repurposing in accordance with examples of the present disclosure. Flowchart 500 may illustrate a fuseload procedure when using a fuse header that indicates how trims may be loaded based on a configurable mapping between fuse addresses and register addresses. In some cases, the functions of flowchart 500 may be performed by a device, such as a fuseload controller 110 as described with reference to FIG. 1.

At 505, the fuseload controller may begin a fuseload procedure to load trims to a set of registers. For example, the fuseload procedure begun at 505 may be triggered by a boot event (e.g., at power up of an SoC) or reboot event, or—additionally or alternatively—as part of a post-fabrication process, such as a trim process associated with a deployment or installation of the SoC. In such cases, the fuseload controller may start the fuseload procedure by reading data from a first fuse address (e.g., Fuse0) that includes a fuse header. At 510, the fuseload controller may read the fuse header and identify one or more subfields within the fuse header.

At 515, the fuseload controller may determine whether the fuse header is empty. For example, the fuseload controller may determine whether a one or more subfields of the fuse header include (or are populated with) non-zero data. In some cases, the fuseload controller may identify that an FID subfield of the fuse header includes non-zero data identifying a current fuse header that is associated with a first fuse header group (or fuse group), where the first fuse header group may include a subset of fuses on a die.

Accordingly, upon determining that the first fuse header is not empty (e.g., based on the existence of non-zero data included in the first fuse header), the fuseload controller may, based on the substance of the non-zero data included in the first fuse header, set a register start address and a fuse address count at 520. In some cases, the subfields within the fuse header may provide an indication of the register start address and the fuse address count, and the fuseload may set these values based on the indication within each subfield.

At 525, the fuseload controller may, based on the identified subfields of the fuse header, copy trim data from a first fuse address to a first set of registers, where the first set of registers include a first register having a register address corresponding to the register start address. At 530, the fuseload controller may read a second fuse address based on the fuse header, and may proceed with copying trim data from the second fuse address to a second set of registers based on the fuse address count. Further, at 535, the fuseload controller may continue copying fuse addresses that are part of the first fuse header group until the fuse address count is satisfied (e.g., reached). For example, at 540 the fuseload controller may determine whether the fuse address count has been reached after incrementing a counter after each fuse address is read. If the fuse address has not been satisfied, the fuseload controller may return to 530 and continue reading additional fuse addresses, copying fuse data from fuse addresses to registers, and check again to determine whether the fuse address count has been reached.

In cases where it has been determined the fuse address count has been satisfied at 540, the fuseload controller may return to 510 and read a second fuse header based on the determination. The second fuse header may be associated with a second fuse header group (or fuse group) and the fuse header may also include subfields that indicate how trims from the second fuse header group are to be copied. Thus, the fuseload controller, at 515, may again determine whether the second fuse header includes non-zero data. If it is determined that the second fuse header is not empty (e.g., includes non-zero data), the fuseload controller may proceed with setting a start register address and fuse count at 520, and proceed with loading trims from fuse addresses, such as described above with reference to 525 through 540. If it is determined that the second fuse header is empty (e.g., the FID subfield or other subfields of the second fuse header does not include non-zero data), the fuseload controller may end the fuseload procedure at 545.

As described above with reference to FIG. 4, the fuseload controller may perform other functions while reading fuse header data from the fuse headers. For instance, an ISO subfield may indicate that a corresponding fuse group may be skipped. Additionally or alternatively, the fuseload controller may determine, from the subfields of a fuse header, what order by which trims are to be copied from fuses to a set of registers.

Figure 6:
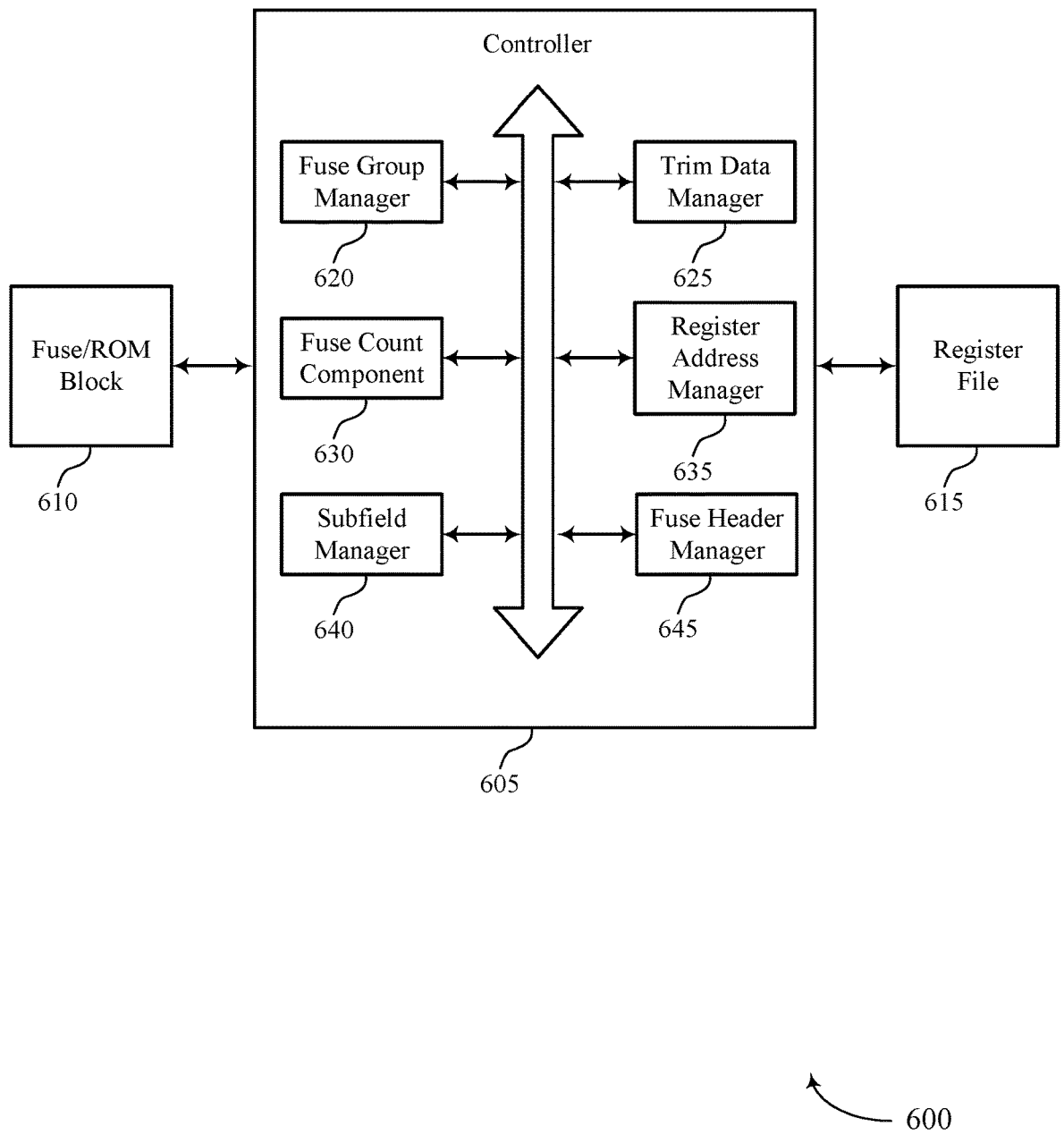
FIG. 6 illustrates block diagram of a controller that supports fuseload architecture for SoC reconfiguration and repurposing in accordance with examples of the present disclosure.

FIG. 6 shows a block diagram 600 of a controller 605 that supports that supports fuseload architecture for SoC reconfiguration and repurposing in accordance with examples of the present disclosure. The controller may be an example of a fuseload controller described herein, such as a fuseload controller 110 as described with reference with FIG. 1. The controller 605 may be coupled with a fuse/ROM block 610 and a register file 615. Additionally, the controller may include a fuse group manager 620, a trim data manager 625, a fuse count component 630, a register address manager 635, a subfield manager 640, and a fuse header manager 645.

In some cases, the controller may also include a processor and memory, where the memory may store computer-readable, computer-executable code including instructions that, when executed, cause the processor to perform various functions described herein. For example, the code may include instructions to implement features of the present disclosure, including instructions to support fuseload procedures. The code may be stored in a non-transitory computer-readable medium such as system memory or other type of memory. In some cases, the code may not be directly executable by the processor but may cause a computer (e.g., when compiled and executed) to perform functions described herein. Each of these modules may communicate, directly or indirectly, with one another (e.g., via one or more buses).

The controller 605 may identify a set of fuses on a die and identify a set of registers coupled with the set of fuses on the die, the set of fuses storing trim data to be copied to the set of registers. In some cases, the controller 605 may determine, based on one or more fuse headers within the trim data, a mapping between fuse addresses for the set of fuses and register addresses for the set of registers and copy trim data from the set of fuses to the identified set of registers based on the mapping.

In some cases, the controller 605 may identify a set of registers coupled with a set of fuses on a die that each have a fuse address, each register of the set of registers having a register address and each fuse of the set of fuses storing a set of trim data available to be copied to the set of registers. In some examples, the controller may identify one or more fuse headers as part of the sets of trim data, each fuse header of the one or more fuse headers corresponding to a fuse group of the one or more fuse groups and indicating a mapping between fuse addresses for the set of fuses and register addresses for the set of registers. In some examples, the controller may determine, based on one or more subfields within each fuse header of the one or more fuse headers, trim data to be copied from each fuse group to a corresponding set of registers using the mapping. In some examples, the controller may copy the determined trim data from the identified set of fuses to the identified set of registers based on the one or more subfields within each fuse header.

The Fuse/ROM block 610 may include the set of fuses on the die, and may be an example of ROM or another type of memory device. The register file 615 may include the set of registers, which may include, for example, control registers, mode registers, data registers, or the like.

The fuse group manager 620 may identify a set of fuse groups, each fuse group of the set respectively corresponding to a fuse header of the one or more fuse headers and including a subset of the set of fuses, where the mapping is based on the set of fuse groups. In some cases, the fuse group manager 620 may identify a first fuse group based on a fuse header of the one or more fuse headers. In some cases, the fuse group manager 620 may identify a number of fuses associated with the first fuse group based on the fuse address count included in the fuse header, where copying the trim data is based on the first fuse group and the number of fuses associated with the first fuse group. In some cases, the fuse group manager 620 may determine whether to skip a first fuse group based on an indication of a skip option within a first fuse header of the one or more fuse headers, the first fuse header corresponding to the first fuse group.

The trim data manager 625 may copy trim data from a first fuse address to a first set of registers, the first set of registers including a first register having a register address corresponding to a register start address. In some examples, the trim data manager 625 may copy the trim data from the second fuse address to a second set of registers based on the fuse address count. In some cases, the trim data manager 625 may copy the trim data from a third fuse address to a third set of registers based on a fuse address count. In some cases, copying the trim data from the set of fuses to the identified set of registers is part of a fuseload procedure.

In some cases, the trim data manager 625 may end the fuseload procedure based on the determination that a fuse header lacks data. In some cases, the trim data manager 625 may copy the trim data from the first fuse group to a first set of registers based on a determination to not skip the first fuse group. Additionally or alternatively, the trim data manager 625 may refrain from copying the trim data from the first fuse group based on a determination to skip the first fuse group. In some cases, the trim data manager 625 may copy the determined trim data from a second fuse group corresponding to the second fuse header in accordance with the header data included in the one or more subfields of the second fuse header.

In some cases, the trim data manager 625 may copy a first portion of the determined trim data stored by a first fuse address to a first register address and copy a second portion of the determined trim data stored by the first fuse address to a second register address. In some examples, copying trim data includes identifying a first fuse group based on a presence of header data within a first fuse header, determining a number of fuse addresses associated with the first fuse group based on the fuse address count for the first fuse header, determining a starting register address based on the register start address for the first fuse header, and copying, until the fuse address count is satisfied, the determined trim data from the determined number of fuse addresses associated with the first fuse group to a first subset of registers including the starting register.

The fuse count component 630 may determine that the fuse address count has not been satisfied. Additionally or alternatively, the fuse count component 630 may determine that the fuse address count has been satisfied. In some cases, the fuse count component 630 may increment, from the first fuse address to a second fuse address, a next fuse address to be read based on a determination that all the determined trim data stored by the first fuse address has been copied.

The register address manager 635 may determine, based on the register start address included in the set of subfields, a beginning register address for copying the trim data from the set of fuses. In some cases, the register address manager 635 may set the register start address and a fuse address count based on the first fuse header being populated with the header data.

The subfield manager 640 may identify a set of subfields within each of the one or more fuse headers, where the set of subfields includes a fuse address count, or a skip option, or a fuse header ID, or a register start address, or any combination thereof, where the mapping is based on the set of subfields. In some cases, the subfield manager 640 may set a register start address and a fuse address count based on the first fuse header being populated with the header data. In some cases, the subfield manager 640 may read the second fuse address based on the header data.

In some examples, the subfield manager 640 may determine a fuseload order for copying the trim data from the identified set of fuses to the identified set of registers based on determining whether the skip option is triggered and one or more of a fuse address count, or a fuse header ID, or a register start address, or a combination thereof. In some examples, the subfield manager 640 may determine, in accordance with the one or more subfields within each fuse header, a fuse address count, or a skip option, or a fuse header ID, or a register start address, or any combination thereof, where copying the determined trim data is based on the fuse address count, or the skip option, or the fuse header ID, or the register start address, or any combination thereof.

The fuse header manager 645 may identify a first fuse header of the one or more fuse headers and determine whether the first fuse header is populated with header data, where copying the trim data is based on determining whether the first fuse header is populated with the header data. In some cases, the fuse header manager 645 may read a second fuse header of the one or more fuse headers based on determining that the fuse address count has been satisfied. In some cases, the fuse header manager 645 may determine that the first fuse header lacks header data. In some examples, the fuse header manager 645 may read a second fuse header of the one or more fuse headers, the second fuse header corresponding to a second fuse group. In some cases, the fuse header manager 645 may read a fuse header corresponding to a fuse group before reading a remaining portion of the fuse group including trim data.

In some examples, the fuse header manager 645 may determine that a first fuse header of the one or more fuse headers indicates that a first fuse group corresponding to the first fuse header is to be skipped, identify a second fuse header of the one or more fuse headers based on the indication that the first fuse group is to be skipped, and determine that the second fuse header includes the one or more subfields having header data. In some cases, the fuse header manager 645 may determine that a first fuse header of the one or more fuse headers is empty and refrain from reading fuse headers that are subsequent to the first fuse header based on the first fuse header.

Figure 7:
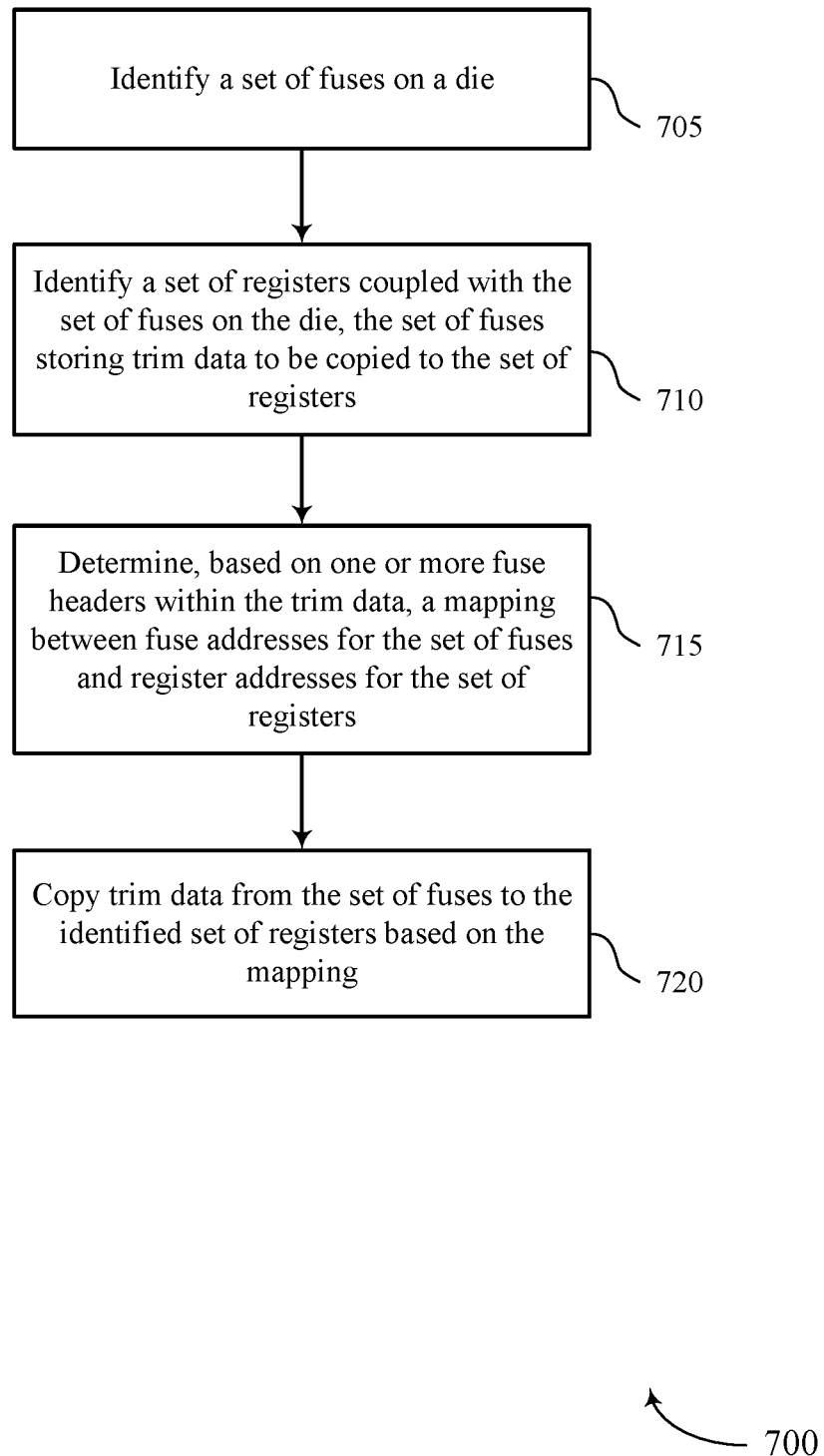
FIGS. 7 and 8 illustrate examples of a method or methods that support a fuseload architecture for SoC reconfiguration and repurposing in accordance with examples of the present disclosure.

FIG. 7 shows a flowchart illustrating a method 700 that supports a fuseload architecture for SoC reconfiguration and repurposing in accordance with examples of the present disclosure. The operations of method 700 may be implemented by a controller or its components as described herein. For example, the operations of method 700 may be performed by a fuseload controller 110 as described with reference to FIG. 1 or a controller 605 as described with reference to FIG. 6.

At 705 the controller may identify a set of fuses on a die. For instance, a die may include multiple fuses for storing information used to configure the functionality of the die. In certain examples, features of the operations of 705 may be performed by a fuseload controller 110 as described with reference to FIG. 1 or a controller 605 as described with reference to FIG. 6. The operations of 705 may be performed according to the techniques described with reference to FIGS. 1 through 5.

At 710 the controller may identify a set of registers coupled with the set of fuses on the die, the set of fuses storing trim data to be copied to the set of registers. In certain examples, features of the operations of 710 may be performed by a fuseload controller 110 as described with reference to FIG. 1 or a controller 605 as described with reference to FIG. 6. The operations of 710 may be performed according to the techniques described with reference to FIGS. 1 through 5.

At 715 the controller may determine, based on one or more fuse headers within the trim data, a mapping between fuse addresses for the set of fuses and register addresses for the set of registers. In certain examples, features of the operations of 715 may be performed by a fuseload controller 110 as described with reference to FIG. 1 or a controller 605 as described with reference to FIG. 6. The operations of 715 may be performed according to the techniques described with reference to FIGS. 1 through 5.

At 720 the controller may copy trim data from the set of fuses to the identified set of registers based on the mapping. In certain examples, features of the operations of 720 may be performed by a fuseload controller 110 as described with reference to FIG. 1 or a controller 605 as described with reference to FIG. 6. The operations of 720 may be performed according to the techniques described with reference to FIGS. 1 through 5.

In some examples, an apparatus as described herein may perform a method or methods, such as the method 700. The apparatus may include features, means, or instructions (e.g., a non-transitory computer-readable medium storing instructions executable by a processor) for identifying a set of fuses on a die and identifying a set of registers coupled with the set of fuses on the die, the set of fuses storing trim data to be copied to the set of registers. Some examples of the method 700, apparatuses, and non-transitory computer-readable medium described herein may further include operations, features, means, or instructions determining, based on one or more fuse headers within the trim data, a mapping between fuse addresses for the set of fuses and register addresses for the set of registers. Some examples of the method 700, apparatuses, and non-transitory computer-readable medium described herein may further include operations, features, means, or instructions for copying trim data from the set of fuses to the identified set of registers based on the mapping.

Some examples of the method 700, apparatuses, and non-transitory computer-readable medium described herein may further include operations, features, means, or instructions for identifying a set of fuse groups, each fuse group of the set respectively corresponding to a fuse header of the one or more fuse headers and including a subset of the set of fuses, where the mapping is based on the set of fuse groups. Some examples of the method 700, apparatuses, and non-transitory computer-readable medium described herein may further include operations, features, means, or instructions for identifying a set of subfields within each of the one or more fuse headers, where the set of subfields includes a fuse address count, or a skip option, or a fuse header ID, or a register start address, or any combination thereof, where the mapping is based on the set of subfields.

Some examples of the method 700, apparatuses, and non-transitory computer-readable medium described herein may further include operations, features, means, or instructions for determining, based on the register start address included in the set of subfields, a beginning register address for copying the trim data from the set of fuses. Some examples of the method 700, apparatuses, and non-transitory computer-readable medium described herein may further include operations, features, means, or instructions for identifying a first fuse group based on a fuse header of the one or more fuse headers. Some examples of the method 700, apparatuses, and non-transitory computer-readable medium described herein may further include operations, features, means, or instructions for identifying a number of fuses associated with the first fuse group based on the fuse address count included in the fuse header, where copying the trim data is based on the first fuse group and the number of fuses associated with the first fuse group.

Some examples of the method 700, apparatuses, and non-transitory computer-readable medium described herein may further include operations, features, means, or instructions for identifying a first fuse header of the one or more fuse headers. Some examples of the method 700, apparatuses, and non-transitory computer-readable medium described herein may further include operations, features, means, or instructions for determining whether the first fuse header is populated with header data, where copying the trim data is based on determining whether the first fuse header is populated with the header data.

Some examples of the method 700, apparatuses, and non-transitory computer-readable medium described herein may further include operations, features, means, or instructions for setting a register start address and a fuse address count based on the first fuse header being populated with the header data. Some examples of the method 700, apparatuses, and non-transitory computer-readable medium described herein may further include operations, features, means, or instructions for copying the trim data from a first fuse address to a first set of registers, the first set of registers including a first register having a register address corresponding to the register start address.

Some examples of the method 700, apparatuses, and non-transitory computer-readable medium described herein may further include operations, features, means, or instructions for reading a second fuse address based on the header data. Some examples of the method 700, apparatuses, and non-transitory computer-readable medium described herein may further include operations, features, means, or instructions for copying the trim data from the second fuse address to a second set of registers based on the fuse address count. Some examples of the method 700, apparatuses, and non-transitory computer-readable medium described herein may further include operations, features, means, or instructions for determining that the fuse address count has not been satisfied. Some examples of the method 700, apparatuses, and non-transitory computer-readable medium described herein may further include operations, features, means, or instructions for copying the trim data from a third fuse address to a third set of registers based on the fuse address count.

Some examples of the method 700, apparatuses, and non-transitory computer-readable medium described herein may further include operations, features, means, or instructions for determining that the fuse address count has been satisfied. Some examples of the method 700, apparatuses, and non-transitory computer-readable medium described herein may further include operations, features, means, or instructions for reading a second fuse header of the one or more fuse headers based on determining that the fuse address count has been satisfied. In some examples of the method 700, apparatuses, and non-transitory computer-readable medium described herein, copying the trim data from the set of fuses to the identified set of registers may be part of the fuseload procedures. Some examples of the method 700, apparatuses, and non-transitory computer-readable medium described herein may further include operations, features, means, or instructions for determining that the first fuse header lacks header data. Some examples of the method 700, apparatuses, and non-transitory computer-readable medium described herein may further include operations, features, means, or instructions for ending the fuseload procedure based on the determination.

Some examples of the method 700, apparatuses, and non-transitory computer-readable medium described herein may further include operations, features, means, or instructions for determining whether to skip a first fuse group based on an indication of a skip option within a first fuse header of the one or more fuse headers, the first fuse header corresponding to the first fuse group. Some examples of the method 700, apparatuses, and non-transitory computer-readable medium described herein may further include operations, features, means, or instructions for copying the trim data from the first fuse group to a first set of registers based on a determination to not skip the first fuse group.

Some examples of the method 700, apparatuses, and non-transitory computer-readable medium described herein may further include operations, features, means, or instructions for refraining from copying the trim data from the first fuse group based on a determination to skip the first fuse group. Some examples of the method 700, apparatuses, and non-transitory computer-readable medium described herein may further include operations, features, means, or instructions for reading a second fuse header of the one or more fuse headers, the second fuse header corresponding to a second fuse group.

Some examples of the method 700, apparatuses, and non-transitory computer-readable medium described herein may further include operations, features, means, or instructions for determining a fuseload order for copying the trim data from the identified set of fuses to the identified set of registers based on determining whether the skip option is triggered and one or more of a fuse address count, or a fuse header ID, or a register start address, or a combination thereof. Some examples of the method 700, apparatuses, and non-transitory computer-readable medium described herein may further include operations, features, means, or instructions for reading a fuse header corresponding to a fuse group before reading a remaining portion of the fuse group including trim data.

Figure 8:
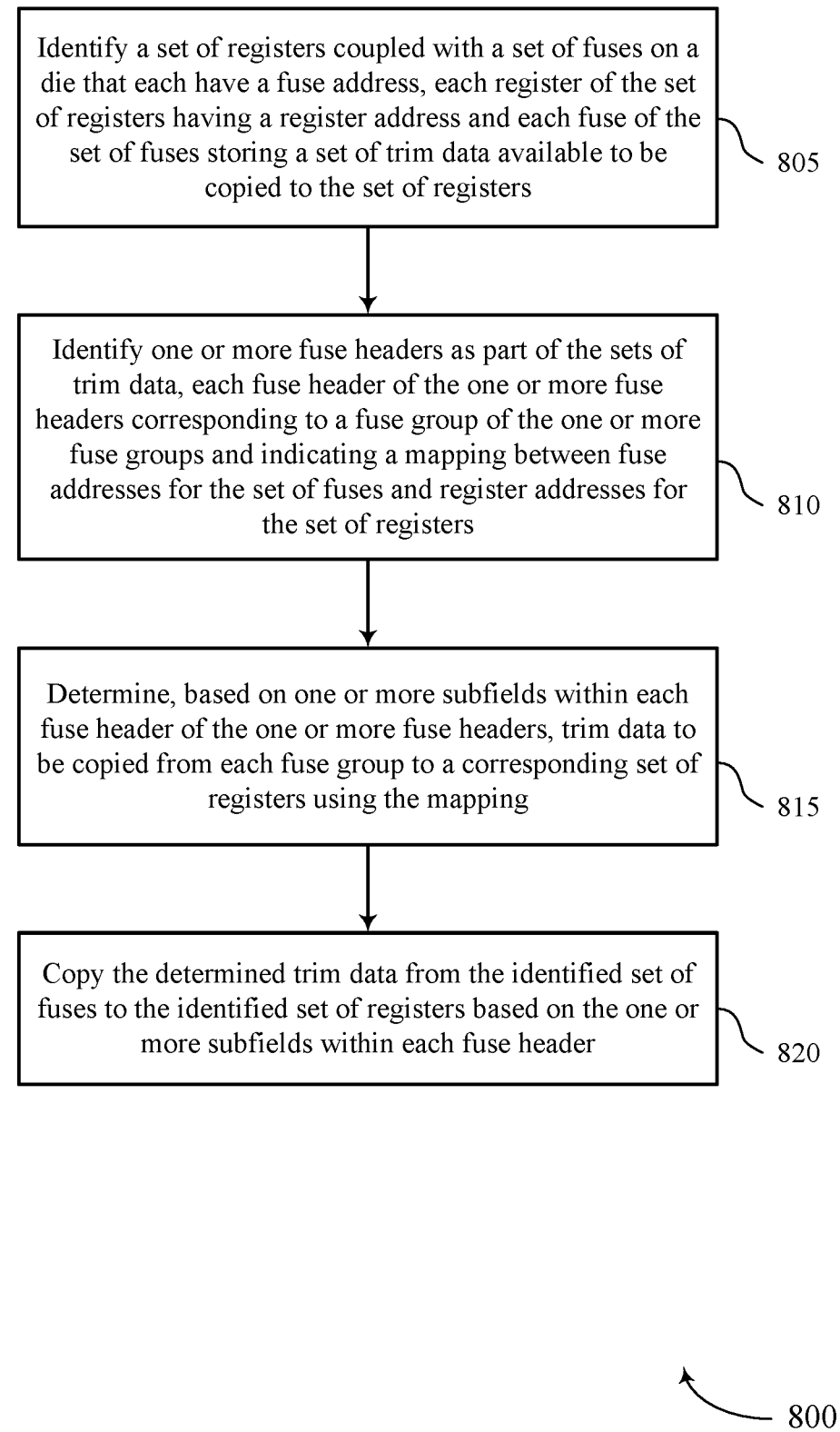

FIG. 8 shows a flowchart illustrating a method 800 that supports a fuseload architecture for SoC reconfiguration and repurposing in accordance with examples of the present disclosure. The operations of method 800 may be implemented by a controller or its components as described herein. For example, the operations of method 800 may be performed by a fuseload controller 110 as described with reference to FIG. 1 or a controller 605 as described with reference to FIG. 6.

At 805 the controller may identify a set of registers coupled with a set of fuses on a die that each have a fuse address, each register of the set of registers having a register address and each fuse of the set of fuses storing a set of trim data available to be copied to the set of registers. In certain examples, features of the operations of 805 may be performed by a fuseload controller 110 as described with reference to FIG. 1 or a controller 605 as described with reference to FIG. 6. The operations of 805 may be performed according to the techniques described with reference to FIGS. 1 through 5.

At 810 the controller may identify one or more fuse headers as part of the sets of trim data, each fuse header of the one or more fuse headers corresponding to a fuse group of the one or more fuse groups and indicating a mapping between fuse addresses for the set of fuses and register addresses for the set of registers. In certain examples, features of the operations of 810 may be performed by a fuseload controller 110 as described with reference to FIG. 1 or a controller 605 as described with reference to FIG. 6. The operations of 810 may be performed according to the techniques described with reference to FIGS. 1 through 5.

At 815 the controller may determine, based on one or more subfields within each fuse header of the one or more fuse headers, trim data to be copied from each fuse group to a corresponding set of registers using the mapping. In certain examples, features of the operations of 815 may be performed by a fuseload controller 110 as described with reference to FIG. 1 or a controller 605 as described with reference to FIG. 6. The operations of 815 may be performed according to the techniques described with reference to FIGS. 1 through 5.

At 820 the controller may copy the determined trim data from the identified set of fuses to the identified set of registers based on the one or more subfields within each fuse header. In certain examples, features of the operations of 820 may be performed by a fuseload controller 110 as described with reference to FIG. 1 or a controller 605 as described with reference to FIG. 6. The operations of 820 may be performed according to the techniques described with reference to FIGS. 1 through 5.

In some examples, an apparatus as described herein may perform a method or methods, such as the method 800. The apparatus may include features, means, or instructions (e.g., a non-transitory computer-readable medium storing instructions executable by a processor) for identifying a set of registers coupled with a set of fuses on a die that each have a fuse address, each register of the set of registers having a register address and each fuse of the set of fuses storing a set of trim data available to be copied to the set of registers. Some examples of the method 800, apparatuses, and non-transitory computer-readable medium described herein may further include operations, features, means, or instructions identifying one or more fuse headers as part of the sets of trim data, each fuse header of the one or more fuse headers corresponding to a fuse group of the one or more fuse groups and indicating a mapping between fuse addresses for the set of fuses and register addresses for the set of registers.

Some examples of the method 800, apparatuses, and non-transitory computer-readable medium described herein may further include operations, features, means, or instructions for determining, based on one or more subfields within each fuse header of the one or more fuse headers, trim data to be copied from each fuse group to a corresponding set of registers using the mapping. Some examples of the method 800, apparatuses, and non-transitory computer-readable medium described herein may further include operations, features, means, or instructions for copying the determined trim data from the identified set of fuses to the identified set of registers based on the one or more subfields within each fuse header.

Some examples of the method 800, apparatuses, and non-transitory computer-readable medium described herein may further include operations, features, means, or instructions for determining, in accordance with the one or more subfields within each fuse header, a fuse address count, or a skip option, or a fuse header ID, or a register start address, or any combination thereof, where copying the determined trim data is based on the fuse address count, or the skip option, or the fuse header ID, or the register start address, or any combination thereof. Some examples of the method 800, apparatuses, and non-transitory computer-readable medium described herein may further include operations, features, means, or instructions for identifying a first fuse group based on a presence of header data within a first fuse header.

Some examples of the method 800, apparatuses, and non-transitory computer-readable medium described herein may further include operations, features, means, or instructions for determining a number of fuse addresses associated with the first fuse group based on the fuse address count for the first fuse header. Some examples of the method 800, apparatuses, and non-transitory computer-readable medium described herein may further include operations, features, means, or instructions for determining a starting register address based on the register start address for the first fuse header. Some examples of the method 800, apparatuses, and non-transitory computer-readable medium described herein may further include operations, features, means, or instructions for copying, until the fuse address count is satisfied, the determined trim data from the determined number of fuse addresses associated with the first fuse group to a first subset of registers including the starting register.

Some examples of the method 800, apparatuses, and non-transitory computer-readable medium described herein may further include operations, features, means, or instructions for determining that a first fuse header of the one or more fuse headers indicates that a first fuse group corresponding to the first fuse header is to be skipped. Some examples of the method 800, apparatuses, and non-transitory computer-readable medium described herein may further include operations, features, means, or instructions for identifying a second fuse header of the one or more fuse headers based on the indication that the first fuse group is to be skipped.

Some examples of the method 800, apparatuses, and non-transitory computer-readable medium described herein may further include operations, features, means, or instructions for determining that the second fuse header includes the one or more subfields having header data. Some examples of the method 800, apparatuses, and non-transitory computer-readable medium described herein may further include operations, features, means, or instructions for copying the determined trim data from a second fuse group corresponding to the second fuse header in accordance with the header data included in the one or more subfields of the second fuse header.

Some examples of the method 800, apparatuses, and non-transitory computer-readable medium described herein may further include operations, features, means, or instructions for determining that a first fuse header of the one or more fuse headers is empty. Some examples of the method 800, apparatuses, and non-transitory computer-readable medium described herein may further include operations, features, means, or instructions for refraining from reading fuse headers that are subsequent to the first fuse header based on the first fuse header.

Some examples of the method 800, apparatuses, and non-transitory computer-readable medium described herein may further include operations, features, means, or instructions for copying a first portion of the determined trim data stored by a first fuse address to a first register address. Some examples of the method 800, apparatuses, and non-transitory computer-readable medium described herein may further include operations, features, means, or instructions for copying a second portion of the determined trim data stored by the first fuse address to a second register address. Some examples of the method 800, apparatuses, and non-transitory computer-readable medium described herein may further include operations, features, means, or instructions for incrementing, from the first fuse address to a second fuse address, a next fuse address to be read based on a determination that all the determined trim data stored by the first fuse address has been copied.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (e.g., majority carriers are signals), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    identifying a set of fuses on a die;
    identifying a set of registers coupled with the set of fuses on the die, the set of fuses storing trim data to be copied to the set of registers;
    determining, based at least in part on one or more fuse headers within the trim data, a mapping between fuse addresses for the set of fuses and register addresses for the set of registers, wherein each fuse header of the one or more fuse headers comprises information for a plurality of fuse addresses and a plurality of register addresses; and
    copying trim data from the set of fuses to the identified set of registers based at least in part on the mapping.

2. The method of claim 1, further comprising:
    identifying a plurality of fuse groups, each fuse group of the plurality respectively corresponding to a fuse header of the one or more fuse headers and comprising a subset of the set of fuses, wherein the mapping is based at least in part on the plurality of fuse groups.

3. The method of claim 1, further comprising:
    identifying a set of subfields within each of the one or more fuse headers, wherein the set of subfields comprises a fuse address count, or a skip option, or a fuse header identity (ID), or a register start address, or any combination thereof, wherein the mapping is based at least in part on the set of subfields.

4. The method of claim 3, further comprising:
determining, based at least in part on the register start address included in the set of subfields, a beginning register address for copying the trim data from the set of fuses.

5. The method of claim 3, further comprising:
identifying a first fuse group based at least in part on a fuse header of the one or more fuse headers; and
identifying a number of fuses associated with the first fuse group based at least in part on the fuse address count included in the fuse header, wherein copying the trim data is based at least in part on the first fuse group and the number of fuses associated with the first fuse group.

6. The method of claim 1, further comprising:
identifying a first fuse header of the one or more fuse headers; and
determining whether the first fuse header is populated with header data, wherein copying the trim data is based at least in part on determining whether the first fuse header is populated with the header data.

7. The method of claim 6, further comprising:
setting a register start address and a fuse address count based at least in part on the first fuse header being populated with the header data; and
copying the trim data from a first fuse address to a first set of registers, the first set of registers including a first register having a register address corresponding to the register start address.

8. The method of claim 7, further comprising:
reading a second fuse address based at least in part on the header data; and
copying the trim data from the second fuse address to a second set of registers based at least in part on the fuse address count.

9. The method of claim 7, further comprising:
determining that the fuse address count has not been satisfied; and
copying the trim data from a third fuse address to a third set of registers based at least in part on the fuse address count.

10. The method of claim 7, further comprising:
determining that the fuse address count has been satisfied; and
reading a second fuse header of the one or more fuse headers based at least in part on determining that the fuse address count has been satisfied.

11. The method of claim 6, wherein copying the trim data from the set of fuses to the identified set of registers is part of a fuseload procedure, the method further comprising:
determining that the first fuse header lacks header data; and
ending the fuseload procedure based at least in part on the first fuse header lacking header data.

12. The method of claim 1, further comprising:
determining whether to skip a first fuse group based at least in part on an indication of a skip option within a first fuse header of the one or more fuse headers, the first fuse header corresponding to the first fuse group.

13. The method of claim 12, further comprising:
copying the trim data from the first fuse group to a first set of registers based at least in part on a determination to not skip the first fuse group.

14. The method of claim 12, further comprising:
refraining from copying the trim data from the first fuse group based at least in part on a determination to skip the first fuse group; and
reading a second fuse header of the one or more fuse headers, the second fuse header corresponding to a second fuse group.

15. The method of claim 12, further comprising:
determining a fuseload order for copying the trim data from the identified set of fuses to the identified set of registers based at least in part on determining whether the skip option is triggered and one or more of a fuse address count, or a fuse header identity (ID), or a register start address, or a combination thereof.

16. The method of claim 1, further comprising:
reading a fuse header corresponding to a fuse group before reading a remaining portion of the fuse group comprising trim data.

17. A method, comprising:
identifying a set of registers coupled with a set of fuses on a die that each have a fuse address, each register of the set of registers having a register address and each fuse of the set of fuses storing a set of trim data available to be copied to the set of registers;
identifying one or more fuse headers as part of the sets of trim data, each fuse header of the one or more fuse headers corresponding to a fuse group of one or more fuse groups and indicating a mapping between a plurality of fuse addresses for the set of fuses and a plurality of register addresses for the set of registers;
determining, based at least in part on one or more subfields within each fuse header of the one or more fuse headers, trim data to be copied from each fuse group to a corresponding set of registers using the mapping; and
copying the determined trim data from the set of fuses to the identified set of registers based at least in part on the one or more subfields within each fuse header.

18. The method of claim 17, further comprising:
determining, in accordance with the one or more subfields within each fuse header, a fuse address count, or a skip option, or a fuse header identity (ID), or a register start address, or any combination thereof, wherein copying the determined trim data is based at least in part on the fuse address count, or the skip option, or the fuse header ID, or the register start address, or any combination thereof.

19. The method of claim 18, wherein copying the determined trim data comprises:
identifying a first fuse group based at least in part on a presence of header data within a first fuse header;
determining a number of fuse addresses associated with the first fuse group based at least in part on the fuse address count for the first fuse header;
determining a starting register address based at least in part on the register start address for the first fuse header; and
copying, until the fuse address count is satisfied, the determined trim data from the determined number of fuse addresses associated with the first fuse group to a first subset of registers including the starting register address.

20. The method of claim 17, further comprising:
determining that a first fuse header of the one or more fuse headers indicates that a first fuse group corresponding to the first fuse header is to be skipped;

identifying a second fuse header of the one or more fuse headers based at least in part on the indication that the first fuse group is to be skipped;

determining that the second fuse header includes the one or more subfields having header data; and copying the determined trim data from a second fuse group corresponding to the second fuse header in accordance with the header data included in the one or more subfields of the second fuse header.

21. The method of claim 17, further comprising:

determining that a first fuse header of the one or more fuse headers is empty; and refraining from reading fuse headers that are subsequent to the first fuse header based at least in part on the first fuse header.

22. The method of claim 17, wherein copying the determined trim data comprises:

copying a first portion of the determined trim data stored by a first fuse address to a first register address;

copying a second portion of the determined trim data stored by the first fuse address to a second register address; and incrementing, from the first fuse address to a second fuse address, a next fuse address to be read based at least in part on a determination that all the determined trim data stored by the first fuse address has been copied.

23. A controller, comprising:

a processor, memory in electronic communication with the processor; and instructions stored in the memory and executable by the processor to cause the controller to:

identify a set of fuses on a die;

identify a set of registers coupled with the set of fuses on the die, the set of fuses for storing trim data to be copied to the set of registers;

determine, based at least in part on one or more fuse headers within the trim data, a mapping between fuse addresses for the set of fuses and register addresses for the set of registers, wherein each fuse header of the one or more fuse headers comprises information for a plurality of fuse addresses and a plurality of register addresses; and copy trim data from the set of fuses to the identified set of registers based at least in part on the mapping.

24. The controller of claim 23, wherein the instructions are further executable by the processor to cause the controller to:

identify a plurality of fuse groups, each fuse group of the plurality respectively corresponding to a fuse header of the one or more fuse headers and comprising a subset of fuses on the die, wherein the mapping is based at least in part on the plurality of fuse groups.

25. The controller of claim 23, wherein the instructions are further executable by the processor to cause the controller to:

identify a set of subfields within each of the one or more fuse headers, wherein the set of subfields comprises a fuse address count, or a skip option, or a fuse header identity (ID), or a register start address, or any combination thereof, wherein the mapping is based at least in part on the set of subfields.

26. The controller of claim 25, wherein the instructions are further executable by the processor to cause the controller to:

determine, based at least in part on the register start address included in the set of subfields, a beginning register address for copying the trim data from the set of fuses.

27. The controller of claim 25, wherein the instructions are further executable by the processor to cause the controller to:

identify a first fuse group based at least in part on a fuse header of the one or more fuse headers; and identify a number of fuses associated with the first fuse group based at least in part on the fuse address count included in the fuse header, wherein copying the trim data is based at least in part on the first fuse group and the number of fuses associated with the first fuse group.

28. A controller, comprising:

a processor, memory in electronic communication with the processor; and instructions stored in the memory and executable by the processor to cause the controller to:

identify a set of registers coupled with a set of fuses on a die that each have a fuse address, each register of the set of registers having a register address, wherein each fuse of the set of fuses is configured to store a set of trim data available to be copied to the set of registers;

identify one or more fuse headers as part of the sets of trim data, each fuse header of the one or more fuse headers respectively corresponding to a fuse group of one or more fuse groups, wherein each fuse header of the one or more fuse headers is configured to indicate a mapping between a plurality of fuse addresses for the set of fuses and a plurality of register addresses for the set of registers;

determine, based at least in part on one or more subfields within each fuse header of the one or more fuse headers, trim data to be copied from each fuse group to a corresponding set of registers using the mapping; and copy the determined trim data from the set of fuses to the identified set of registers based at least in part on the one or more subfields within each fuse header.

29. The controller of claim 28, wherein the instructions are further executable by the processor to cause the controller to:

determine, in accordance with the one or more subfields within each fuse header, a fuse address count, or a skip option, or a fuse header identity (ID), or a register start address, or any combination thereof, wherein copying the determined trim data is based at least in part on the fuse address count, or the skip option, or the fuse header ID, or the register start address, or any combination thereof.

30. The controller of claim 28, wherein the instructions are further executable by the processor to cause the controller to:

determine that a first fuse header of the one or more fuse headers indicates that a first fuse group corresponding to the first fuse header is to be skipped;

identify a second fuse header of the one or more fuse headers based at least in part on the indication that the first fuse group is to be skipped;

determine that the second fuse header includes the one or more subfields having header data; and copy the determined trim data from a second fuse group corresponding to the second fuse header in accordance with the header data included in the one or more subfields of the second fuse header.

31. The controller of claim 28, wherein the instructions are further executable by the processor to cause the controller to:
   determine that a first fuse header of the one or more fuse headers is empty; and
   refrain from reading fuse headers that are subsequent to the first fuse header based at least in part on the first fuse header.

32. The controller of claim 28, wherein the instructions to copy the determined trim data are executable by the processor to cause the controller to:
   copy a first portion of the determined trim data stored by a first fuse address to a first register address;
   copy a second portion of the determined trim data stored by the first fuse address to a second register address; and
   increment, from the first fuse address to a second fuse address, a next fuse address to be read based at least in part on a determination that all of the determined trim data stored by the first fuse address has been copied.

33. A non-transitory computer-readable medium storing code, the code comprising instructions executable by a processor to:
   identify a set of fuses on a die;
   identify a set of registers coupled with the set of fuses on the die, the set of fuses storing trim data to be copied to the set of registers;
   determining, based at least in part on one or more fuse headers within the trim data, a mapping between fuse addresses for the set of fuses and register addresses for the set of registers, wherein each fuse header of the one or more fuse headers comprises information for a plurality of fuse addresses and a plurality of register addresses; and
   copy trim data from the set of fuses to the identified set of registers based at least in part on the mapping.

34. The non-transitory computer-readable medium of claim 33, wherein the instructions are further executable to:
   identify a plurality of fuse groups, each fuse group of the plurality respectively corresponding to a fuse header of the one or more fuse headers and comprising a subset of the set of fuses on the die, wherein the mapping is based at least in part on the plurality of fuse groups.

35. The non-transitory computer-readable medium of claim 33, wherein the instructions are further executable to:
   identify a set of subfields within each of the one or more fuse headers, wherein the set of subfields comprises a fuse address count, or a skip option, or a fuse header identity (ID), or a register start address, or any combination thereof, wherein the mapping is based at least in part on the set of subfields.

* * * * *